United States Patent
Mase et al.

(10) Patent No.: US 10,765,498 B2
(45) Date of Patent: Sep. 8, 2020

(54) METHOD FOR POLISHING ARTIFICIAL TOOTH AND DEVICE FOR POLISHING ARTIFICIAL TOOTH

(71) Applicant: FUJI MANUFACTURING CO., LTD., Tokyo (JP)

(72) Inventors: Keiji Mase, Tokyo (JP); Shozo Ishibashi, Tokyo (JP); Takahiro Shima, Tokushima (JP)

(73) Assignee: FUJI MANUFACUTURING CO., LTD., Tokyo (JP)

(*) Notice: Subject to any disclaimer, the term of this patent is extended or adjusted under 35 U.S.C. 154(b) by 311 days.

(21) Appl. No.: 15/925,906

(22) Filed: Mar. 20, 2018

(65) Prior Publication Data
US 2018/0333238 A1    Nov. 22, 2018

(30) Foreign Application Priority Data
May 16, 2017    (JP) .................... 2017-097610

(51) Int. Cl.
*A61C 17/16*    (2006.01)
*A61C 3/025*    (2006.01)
(Continued)

(52) U.S. Cl.
CPC .............. *A61C 17/16* (2013.01); *A61C 3/025* (2013.01); *A61C 5/70* (2017.02); *A61C 13/12* (2013.01); *A61C 13/087* (2013.01); *A61C 19/007* (2013.01)

(58) Field of Classification Search
CPC ........... A61C 17/16; A61C 5/70; A61C 3/025; A61C 13/12; A61C 13/087; A61C 19/007
(Continued)

(56) References Cited

U.S. PATENT DOCUMENTS

RE23,422 E * 10/1951 Perry .................... B24C 11/00
                                                        451/39
3,885,313 A *  5/1975 Kikuchi ................. A61C 13/12
                                                        433/213
(Continued)

FOREIGN PATENT DOCUMENTS

JP    H05-30746 Y    8/1993
JP    H06-327700 A    11/1994
(Continued)

OTHER PUBLICATIONS

Office Action for corresponding Korean patent application No. 10-2018-0138255.

*Primary Examiner* — George B Nguyen
(74) *Attorney, Agent, or Firm* — Pearne & Gordon LLP

(57) ABSTRACT

An artificial tooth 30 to be polished is fixed at a tooth neck 32 side and rotated about a tooth axis 33. Abrasives, preferably elastic abrasives formed by kneading abrasive grains into or supporting abrasive grains on an elastic material, are ejected together with a compressed gas at an ejection pressure of from 0.1 MPa to 0.5 MPa onto an occlusal portion 31 side of the artificial tooth 30 while the artificial tooth 30 is being rotated. The abrasives are ejected at an inclination angle θ with respect to the tooth axis 33 of the artificial tooth 30 of from 0° to 90°, and preferably from 15° to 75°. Portions on the occlusal portion 31 and side surfaces 38 of the artificial tooth 30 are thereby polished at the same time by the abrasive sliding over these portions.

8 Claims, 8 Drawing Sheets

(51) Int. Cl.
*A61C 5/70* (2017.01)
*A61C 13/12* (2006.01)
*A61C 13/087* (2006.01)
*A61C 19/00* (2006.01)

(58) Field of Classification Search
USPC .................................................. 451/39, 381
See application file for complete search history.

(56) References Cited

U.S. PATENT DOCUMENTS

| | | | | |
|---|---|---|---|---|
| 5,135,393 A | * | 8/1992 | Eidenbenz | A61C 13/0003 433/53 |
| 5,573,445 A | * | 11/1996 | Rasmussen | B08B 3/12 430/127 |
| 5,709,587 A | * | 1/1998 | Shaffer | B24B 1/00 451/38 |
| 5,775,911 A | * | 7/1998 | Hahn | A61C 13/0003 264/19 |
| 5,989,031 A | * | 11/1999 | Kura | A61C 13/09 264/19 |
| 6,520,838 B1 | * | 2/2003 | Shaw | B24C 1/04 451/38 |
| 6,641,340 B1 | * | 11/2003 | Hajjar | A61C 13/0003 269/283 |
| 7,189,076 B1 | * | 3/2007 | Rosenfeld | A61C 13/09 433/201.1 |
| 7,234,938 B2 | | 6/2007 | Bodenmiller | |
| 8,926,399 B2 | * | 1/2015 | Asai | B24C 1/00 451/102 |
| 10,245,123 B2 | * | 4/2019 | Bertagnon | B23Q 3/103 |
| 2003/0171820 A1 | * | 9/2003 | Wilshaw | A61F 2/30767 623/23.12 |
| 2005/0263170 A1 | * | 12/2005 | Tannous | B08B 5/02 134/1.1 |
| 2014/0094096 A1 | * | 4/2014 | Wu | B24B 1/04 451/64 |
| 2014/0295209 A1 | * | 10/2014 | Yao | B24C 1/06 428/613 |
| 2014/0295373 A1 | * | 10/2014 | Braegger | A61C 19/063 433/82 |
| 2014/0328636 A1 | * | 11/2014 | Stutz, Jr. | B65G 53/40 406/128 |
| 2017/0273766 A1 | * | 9/2017 | Fisker | B33Y 10/00 |

FOREIGN PATENT DOCUMENTS

| | | |
|---|---|---|
| JP | 2001-260027 A | 9/2001 |
| JP | 2002-320626 A | 11/2002 |
| JP | 2004-243464 A | 9/2009 |
| JP | 2015-223325 A | 12/2015 |

* cited by examiner

RELATED ART

METHOD FOR POLISHING ARTIFICIAL TOOTH AND DEVICE FOR POLISHING ARTIFICIAL TOOTH

BACKGROUND OF THE INVENTION

1. Field of the Invention

The present invention relates to a method for polishing artificial teeth and a device for polishing artificial teeth. More particularly, the present invention relates to a method for polishing artificial teeth, and a device for polishing artificial teeth, in which blasting is performed by ejecting an abrasive together with a compressed gas.

2. Description of the Related Art

After molding an artificial tooth, such as a crown, and before fitting inside the oral cavity of a patient, any surfaces of portions of the artificial tooth that will make contact inside the oral cavity are given a finishing polish to a glossy finish or a mirror finish. This not only makes the appearance more beautiful, but also improves the fitting sensation and enables helps prevent dirt, such as plaque, from being deposited.

Such a finishing polish of artificial teeth is normally performed manually on a one-by-one basis by a qualified dental technician using a rotating tool such as a router. Polishing is performed by swapping over bits and brushes of different shapes, dressers (whetstones), and the like to match the shape of the locations to be polished on the artificial teeth. Variations arises in the duration of finishing and the precision of finishing due to differences in the level of experience and technical ability of the individual dental technician, and differences in the abrasive and tools employed, etc.

Moreover, due to decisions regarding the finishing polish being made by each dental technician, sometimes changes the shape of the artificial tooth occur when over polishing is performed in an attempt to raise the precision of finishing. The assessment of finishing is difficult because sometimes such over polishing leads to poor bite when fitted, to a decreased strength of the artificial tooth, etc. occurring, and so on.

A reduction in strength arising from wall thinning gives rise to a particular concern regarding post fitting cracks and breaks for crowns manufactured from a resin, such as CAD/CAM crowns manufactured from a resin called a hybrid resin, which have recently been included in medical treatment covered by health insurance.

Variation arises in finishing precision for each dental technician when manual polishing is performed in such a manner by individual dental technicians, making it difficult to unify and standardize the finished state. Moreover, polishing operations to polish artificial teeth manually on a one-by-one basis take a long duration, imposing a great burden of labor on the dental technicians.

There is accordingly a great need for a polishing device capable of performing the polishing of such artificial teeth in a standardized and quantitative manner automatically, without being dependent on manual operation.

There is a proposal for such a polishing device 100 in JP2015-223325A. In the polishing device 100, as illustrated in FIG. 5, second rotation shafts 102 are provided that rotate themselves, while also revolving around a first rotation shaft 101 as the first rotation shaft 101 rotates. This proposal is configured by mounting artificial teeth 130 to tools 145 fixed to the leading ends of rotating fan shaped holders 103 mounted to the leading ends of the second rotation shafts 102. Abrasives 160 are filled into an abrasive tank 104, and the second rotation shafts 102 are rotated and caused to revolve while the holders 103 are in an immersed state in the abrasives 160.

In such a configuration, the artificial teeth 130 fixed to the holders 103 move through the abrasives 160 stored in the abrasive tank 104 as the holders 103 rotate, so as to be polished by contact with the abrasives 160.

The polishing device 100 described in JP2015-223325A, as explained above, enables plural artificial teeth 130 to be polished at the same time and to a similar finish by operating the polishing device 100 continuously for a predetermined duration.

However, in the above configuration, the abrasives 160 filled in the abrasive tank 104 are in a state of which fluidity of the abrasives 160 are poor during polishing due to adsorption forces between particles. Thus, even though the artificial teeth 130 pass through the abrasives 160, the abrasive does not readily flow into any indentations formed in the surface of the artificial teeth 130. Moreover, polishing of the inside of the indentations is also difficult to perform since any abrasive that has entered into the indentations tends to remain therein.

Consider artificial teeth 130 including cusps 131a that are protrusions and fissures 131b that are indentations, such as on the occlusal surface 131 of the artificial teeth 130 replicating molars as illustrated in FIG. 6A. Although the cusp 131a portions on the occlusal surface 131 are readily polished, the polishing does not readily reach the fissure 131b portions. Insufficient polishing accordingly occurs at the fissure 131b portions if polishing is performed with reference to the polished state of the cusps 131a. A need accordingly arises, after polishing using the polishing device 100, for extra manual re-polishing of the fissure 131b portions using an ultrafine bit, a router installed with a Robinson brush, or the like.

On the other hand, if polishing is performed with the polishing device 100 to the point at which the fissures 131b are sufficiently polished, then the cusps 131a and side surfaces 138 will be over polished. Any change in shape that arises is a concern with respect to decreasing strength and a change in bite when fitted.

When the artificial tooth 130 is a crown, as illustrated in cross-section in FIG. 6B, then if polishing reaches inner walls 137 of a hollow portion 136 of the crown 130 (the portion into which an anchor tooth 170 is inserted during fitting), a gap will arise between shaft faces 171 of the anchor tooth 170 and the inner walls 137 of the crown 130 when the crown is fitted over the anchor tooth 170. This is a cause of the crown 130 falling out or wobbling after fitting.

The hollow portions 136 accordingly need to be tightly sealed when polishing is performed by the method described in JP2015-223325A, so that the abrasives 160 do not enter the hollow portions 136 of the crown 130. Strong fixing is also required so that the crowns 130 do not come away from the holders 103 due to incurring the large resistance from contact with the abrasives when being rotated inside the abrasive tank 104.

In order to tightly seal such hollow portions 136 and to achieve strong fixing, in the configuration of JP2015-223325A, the tools 145 are prepared with integral plaster support bases 145a at the leading ends of spindles 145b, as illustrated in the enlargement in FIG. 5. The crowns 130 are fitted onto the plaster support bases 145a of the tools 145 and bonded with adhesive (see paragraph [0018] in JP2015-

223325A). The spindles 145*b* of the tools 145 are fastened by bolts into mounting holes (not illustrated in the drawings) provided in the holders 103, thereby mounting the crowns 130 strongly to the holders 103. The operations to attach/detach the artificial teeth from the tools 145, and the operations to attach/detach the crowns 130 from the holders 103 are accordingly complicated. There is also the added complication that an operation is required to remove any remaining portions of the plaster support bases 145*a* or adhesive stuck inside the hollow portions 136 of the crowns 130 after the tools 145 that were strongly bonded with adhesive have been removed.

Moreover, the shape of margin portions 134 (see FIGS. 6A and 6B) forming the peripheral edges of the crown 130 becomes particularly important when the artificial teeth are crowns 130. If any lifting up or not-flat portion develops between the margin portions 134 and the anchor teeth 170, then plaque will build up at these portions, with this being a cause of alveolar pyorrhea occurring. The margin portions 134 accordingly need to be shaped such that there is a continuous transition from the margin portions 134 toward the anchor tooth when the crown 130 has been fitted to the anchor tooth, so that the boundary between the margin portions 134 and the anchor tooth is closed off, as illustrated in FIG. 6B.

Moreover, as well as being portions where the wall thickness is thinner than other portions, the margin portions 134 also configured with portions at edges 135 which are prone to becoming the start of cracks and breaks. It is accordingly particularly important to secure the wall thickness of the margin portions 134 in order to maintain the strength in crowns 130 manufactured from a resin.

However, in the polishing method described in JP2015-223325A, each of the crowns fitted to the plaster support base 145*a* is moved through the abrasives 160 in a direction orthogonal to a tooth axis 133. Due to the abrasive impacting the margin portion 134 and the plaster support base 145*a* in the orthogonal direction, the plaster support base 145*a* that is manufactured from the comparatively soft plaster is ground, and a stepped portion develops between the leading end (the edge 135) of the margin portion 134 and the plaster support base 145*a*. The leading end (the edge 135) of the margin portion 134 is accordingly ground to a greater extent than other portions due to the abrasives 160 moving along the not-flat portion. Thus when the crown 130, with the edge 135 of the margin portion 134 ground in this manner, is fitted to the anchor tooth 170, a not-flat portion appears at the edge 135 portion.

The side surfaces 138 of the artificial teeth 130 are disposed in directions orthogonal to the movement direction in such a polishing method, and are accordingly more readily polished than the occlusal surfaces 131 disposed parallel to the movement direction. The polishing of the side surface accordingly progresses with ease, with this being liable to lead to wall thinning at the margin portions 134.

Moreover, a motor M that generates high torque needs to be installed in order to rotate the holders 103 as they incur the large rotational resistance arising from contact with the abrasives 160 filling the abrasive tank 104. There is also a need to install a strong motive force transmission mechanism and rotation shafts (101, 102) to transmit the output of the motor M to the holders 103. This results in the overall installation becoming bulky and costly, and increases running costs due to high power consumption.

An example has been described above of application to individually produced teeth for each patient, such as in cases in which the artificial teeth are crowns. However, note that there is still sometimes a need for similar polishing even with artificial teeth mass produced in a factory using molds, such as artificial teeth to be used by mounting in a denture base. Examples thereof are polishing after de-molding, polishing in manufacturing processes in the factory, and re-polishing as fine adjustments are made when mounting to the denture base.

The present invention is configured to address the deficiencies of the related art described above. An object of the present invention is to provide a polishing method and a polishing device for artificial teeth that enable artificial teeth to be polished in a uniform and standardized manner using a comparatively simple method, without being dependent on manual operation. In particular, an object is to provide a polishing method and a polishing device that when applied to artificial teeth for crowns enables the following: the prevention of polishing of the crown interior and over polishing of margin portions, which can cause loose fitting and wobbling to occur as well as cracks and breaks etc. when fitted; and polishing to be performed to the whole of artificial teeth in a uniform and quantitative manner.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the object described above, a method for polishing artificial teeth 30 (hereinafter also referred to as "a polishing method") comprises:

fixing an artificial tooth 30 to be polished at a tooth neck 32 side of the artificial tooth, and rotating the artificial tooth 30 about a tooth axis 33 of the artificial tooth 30; and polishing an occlusal portion 31 and a side surface 38 of the artificial tooth 30 by ejecting abrasives 60 together with compressed gas through a blast nozzle 20 having a tip 20*a* pointing toward the occlusal portion 31 of the rotating artificial tooth 30, with the blast nozzle 20 inclined such that an inclination angle θ of a central axis 24 of the blast nozzle 20 with respect to the tooth axis 33 is from 0° to 90° (see FIG. 1).

Note that in the present invention the "tooth axis 33" is a longitudinal axis of the tooth including the root of the tooth, the "occlusal portion 31" is an end portion on the meshing side of upper and lower teeth, and indicates the incisal edge of an incisor, the tip of a canine, and the occlusal surface of a molar, and the "tooth neck 32" indicates an end portion of an artificial tooth 30 on the opposite side to the occlusal portion 31.

Preferably, in the above method, elastic abrasives formed by dispersing abrasive grains within an elastic material, or elastic abrasives formed by adhering abrasive grains to a surface of a core formed from an elastic material, is employed as the abrasives 60.

Preferably, the abrasives 60 are ejected in a state in which the central axis 24 of the blast nozzle 20 is inclined so that an inclination angle θ with respect to the tooth axis 33 is from 15° to 75°.

Furthermore, the polishing method may be configured as follows:

a plurality of artificial teeth 30 are moved along a common movement path; and the tip 20a of the blast nozzle 20 which is common to the plurality of artificial teeth 30 is placed so as to point toward a treatment position P at a predetermined position on the movement path, such that the tip 20a of the blast nozzle 20 points toward the occlusal portion 31 of the artificial tooth 30 present at the treatment position P.

The polishing method may include a step for mounting a spindle 45b acting as an axis of rotation at the tooth neck 32 side of the artificial tooth coaxially with the tooth axis 33. In such a case, the artificial tooth 30 preferably includes a hollow portion 36 open on the tooth neck 32 side of the artificial tooth 30 such as a crown. The hollow portion 36 may be filled from the tooth neck 32 side with a thermoplastic material configured by a blend of a synthetic resin that softens at a temperature at or below 100° C., at about 60° C. for example, a natural resin, a wax, beeswax, or the like. After one end of the spindle 45b has been inserted into the filled thermoplastic material, the support base 45a may be formed by cooling to harden the thermoplastic material inside the hollow portion 36 by, for example, ejecting a coolant as a cold spray, thereby, the spindle 45b is mounted on the artificial tooth 30.

The polishing method according to the present invention especially suitable to apply to a molar single crown manufactured from resin.

Furthermore, a device 1 for polishing artificial teeth 30 (hereinafter also referred to as a polishing device 1) comprises:

a support tool 40 including a head 41 for fixing an artificial tooth 30 to a tooth neck 32 side of the artificial tooth 30, the support tool 40 rotating the artificial tooth 30 fixed to the head 41 about a tooth axis 33; and a blast nozzle 20 that ejects abrasives 60 together with compressed gas, the blast nozzle 20 including a tip 20a pointing toward a position where an occlusal portion 31 of the artificial tooth 30 fixed to the head 41 of the support tool 40 is placed, and a central axis 24 of the blast nozzle 20 being inclined so that an inclination angle θ with respect to a rotation axis 42 of the head 41 is from 0° to 90° (see FIGS. 1 and 3).

Preferably, the inclination angle θ of the central axis 24 of the blast nozzle 20 with respect to the rotation axis 42 of the head 41 is from 15° to 75°.

Furthermore, the polishing device 1 may comprise:

a plurality of the heads 41 which are provided so as to move along a single same movement path; and the blast nozzle 20 which is common to the plurality of heads 41 and placed such that the tip 20a points toward a treatment position P at a predetermined position on the movement path of the heads 41.

Advantageous Effects

Due to the present invention being configured as described above, the present invention is able to obtain the following significant advantageous effects.

An artificial tooth 30 to be polished is fixed at a tooth neck 32 side thereof and rotated about a tooth axis 33. Portions from an occlusal portion 31 side to a side surface 38 of the artificial tooth 30 can be polished at the same time by ejecting the abrasives through a blast nozzle 20 having a tip 20a pointing toward the occlusal portion 31 of the rotating artificial tooth 30 and having a central axis 24 inclined at an inclination angle θ of from 0° to 90° with respect to the tooth axis 33.

Moreover, the abrasives ejected in this manner readily enter even indentations in the surface of the artificial tooth 30, and polishing can be performed uniformly even when the artificial tooth 30 includes indentations and protrusions on its surface. By ejecting the abrasives in the ejection direction described above, a flow of abrasives is generated and the flow moves from the occlusal portion 31 side of the artificial tooth 30 toward the tooth neck 32 side. This flow of abrasives flows over the side surface 38 of the artificial tooth 30, as illustrated in FIG. 4A. This means that the abrasives do not readily enter into the hollow portion 36 of the artificial tooth 30 even when the artificial tooth 30 to be polished is a crown, enabling loose fitting that arises from polishing an internal wall 37 of the hollow portion 36 to be prevented from occurring when fitted.

Moreover, due to the abrasives that move over the side surface 38 of the artificial tooth 30 as described above moving from the occlusal portion 31 side to the tooth neck 32 side, a margin portion 34 and an end portion (edge 35) of the margin portion 34 can be prevented from being excessively ground. This accordingly enables to prevent a decrease in strength accompanying wall thinning due to over polishing, or a not-flat portion between the edge 35 of the margin portion 34 and an anchor tooth appearing when fitted. This is favorable for the prevention of cracks and breaks occurring after fitting due to a decrease in strength, for the prevention of deposition of plaque accompanying generation of the non-flat portion, and for the prevention of the occurrence of alveolar pyorrhea accompanying such plaque deposition.

When an elastic abrasive is employed as the abrasive 60, an elastic body that is a configuration member of the elastic abrasive absorbs shock on impact with the artificial tooth 30, facilitating movement (sliding) of the abrasive 60 so as to slide along the surface of the artificial tooth 30. This enables the surface of the artificial tooth 30 to be polished more simply to a glossy finish, mirror finish, or the like, while preventing over polishing. In particular, a configuration in which the central axis 24 of the blast nozzle 20 is inclined with respect to the tooth axis 33 at an inclination angle θ of from 15° to 75° results in the abrasives 60 being incident an angle inclined to both the occlusal portion (occlusal surface) 31 and the side surface 38 of the artificial tooth 30. This facilitates sliding of the abrasives 60 at the surface of the artificial tooth 30, and makes polishing to a mirror finish etc. even easier.

Furthermore, by moving plural artificial teeth 30 along a common movement path, and placing the tip 20a of the blast nozzle 20 that is common to the plural artificial teeth 30 so as to point toward a treatment position P at a predetermined position on the movement path, a configuration is achieved in which the tip 20a of the blast nozzle 20 at the treatment position P points toward the occlusal portion 31 of the artificial tooth 30 that moved to the treatment position P. This enables plural artificial teeth 30 to be polished in succession, and enables productivity to be greatly improved.

A spindle 45b acting as a rotation axis is moreover easily mounted in a configuration in which the spindle 45b is mounted to the tooth neck 32 side of the artificial tooth 30 using a thermoplastic material that softens at a temperature at or below 100° C. In such configuration, the ingress of the abrasive into the hollow portion 36 can also be prevented when the thermoplastic material has been cooled and become a support base 45a, thereby closely sealing the hollow portion 36 of the artificial tooth 30 for a crown. Moreover, in the configuration, after polishing has been completed, the support base 45a can be softened or dissolved by heating to a temperature at or below 100° C., for example, by cleaning with warm or hot water, so as to enable easy removal of the support base 45a and the spindle 45b.

In the polishing method of the present invention, in which the abrasives 60 are ejected together with compressed gas, the abrasives readily enter indentations occurring on the surfaces of the artificial tooth 30 so as to perform polishing as described above. This means that even for artificial teeth 30 having indentations and protrusions such as cusps 31a and fissures 31b on the occlusal portion (occlusal surface) 31, such as when the artificial teeth 30 to be polished are artificial teeth for molars, the cusps 31a that are protrusions and the fissures 31b that are indentations can be polished uniformly. The whole of such an artificial tooth 30 can accordingly be polished uniformly by polishing with a single polishing device, without separate manual polishing of the fissures 31b that are indentations, and without over polishing the cusps 31a that are protrusions.

The polishing method and polishing device of the present invention are accordingly suitably employed to polish artificial teeth manufactured from a resin, which are liable to be over polished due to resins being comparatively soft materials and which are also liable to decrease in strength when over polished. The polishing method and polishing device of the present invention are favorably compatible with polishing CAD/CAM crowns manufactured from a hybrid resin, for which there is a high need for high volume polishing with the increasing demand resulting from transitioning from a leading edge treatment to a treatment covered by health insurance on Apr. 1, 2014 in Japan.

BRIEF DESCRIPTION OF DRAWINGS

The objects and advantages of the invention will become understood from the following detailed description of preferred embodiments thereof in connection with the accompanying drawings in which like numerals designate like elements, and in which:

FIG. 4A is when polished under conditions of the present invention, and FIG. 4B is when polished under conditions lying outside the scope of the present invention;

FIG. 6A is a front view of a molar crown, and FIG. 6B is a cross-section of the molar crown.

DETAILED DESCRIPTION OF THE PREFERRED EMBODIMENTS

Figure 1:
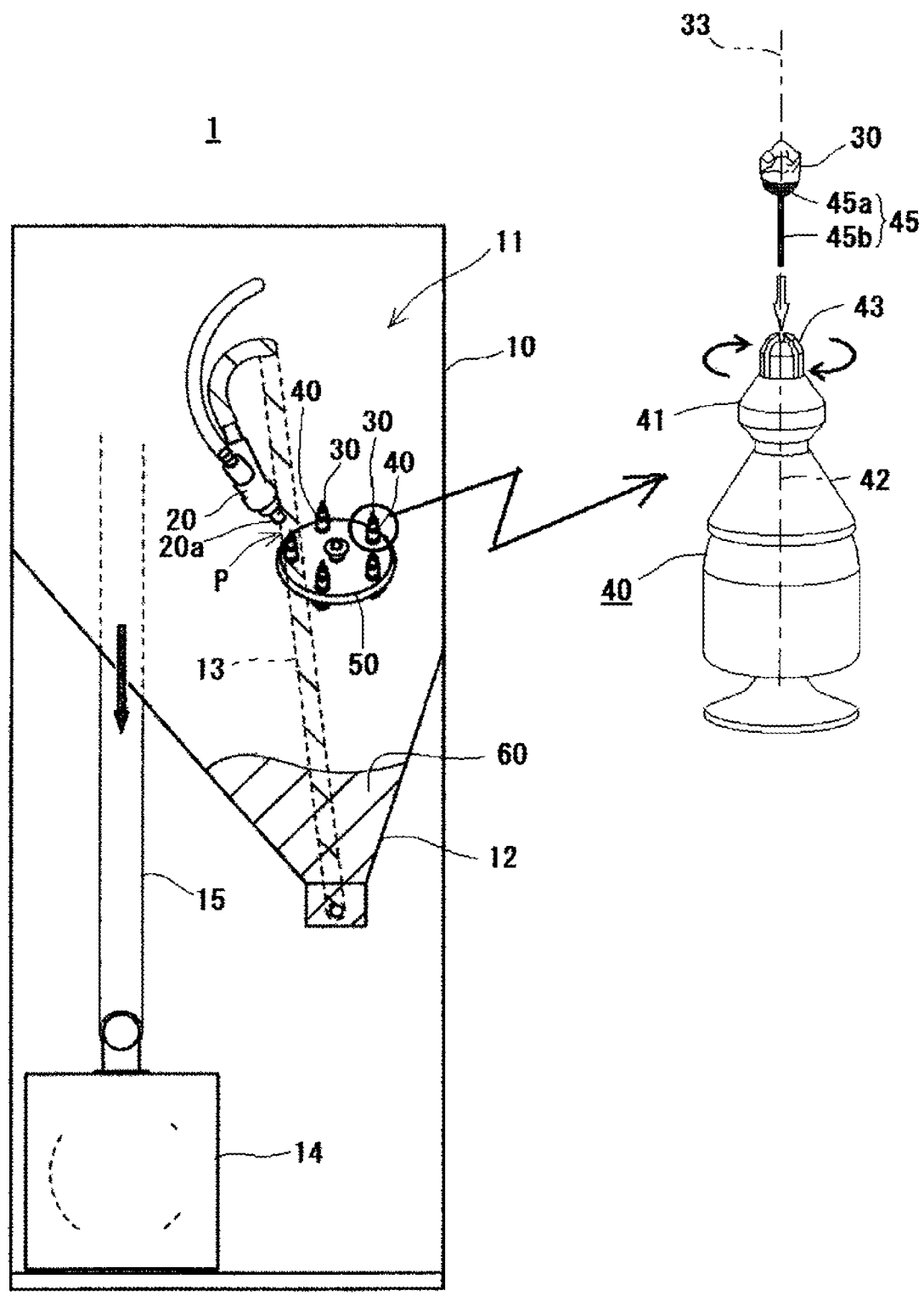
FIG. 1 is a perspective view from the front of a polishing device of the present invention.

A description follows regarding embodiments of the present invention, with reference to the appended drawings.

Polishing Subject

The subject of polishing by the polishing method of the present invention is an artificial tooth used in dentistry. There are no limitations to the type of artificial tooth used in dentistry, and the polishing method is applicable to various types of artificial tooth.

Examples of such types of artificial tooth include artificial teeth to be fitted directly to anchor teeth such as crowns or bridges, as well as artificial teeth that are employed by embedding in a denture base such as artificial teeth used for false teeth (dentures), and artificial teeth that are fitted to a patient through a member other than an anchor tooth, such as artificial teeth used in implants, artificial teeth serving as upper structures mounted on artificial roots through abutments, and the like. Preferably application is made to an artificial tooth 30 that includes a hollow portion 36 open on a tooth neck 32 side thereof, such as a crown or bridge, or artificial teeth serving as the upper structure of implants.

Types of artificial teeth include replicas of incisors, canines, and molars corresponding to natural teeth types, and these may all be subjected to treatment by the polishing method of the present invention.

Moreover, materials for artificial teeth include various materials such as metals, ceramics, resins, and the like, and the polishing method of the present invention is applicable to artificial teeth manufactured from any of these materials, and is also applicable to artificial teeth of various other known materials for artificial teeth.

The durability of artificial teeth differs according to the material thereof. Artificial teeth manufactured from a resin are the most inferior in terms of durability compared to artificial teeth manufactured from a metal or a ceramic as mentioned above. This tendency is also similar for artificial teeth manufactured from a composite resin, called a hybrid resin or the like, in which resistance to wear is improved by blending in a filler made from synthetic silica, ceramic, or the like. The effects of lowered strength etc. due to wall thinning from over polishing is most significantly apparent in artificial teeth manufactured from a resin, including artificial teeth manufactured from a hybrid resin.

The reduction in strength due to wall thinning is generally a significant problem that occurs with crowns that include a hollow portion 36 for inserting an anchor tooth into and that have a hollow interior. Uneven polishing is liable to occur in artificial teeth replicating molars, where there are cusps 31a that are protrusions and fissures 31b that are indentations on an occlusal surface 31.

The polishing method of the present invention is able to uniformly polish without unevenness even artificial teeth that include indentations and protrusions such as artificial teeth for molars, is not liable to polish the inside of the hollow portions 36 as described later even when applied to crowns, and is able to prevent over polishing of margin portions 34 etc. as described later. Thus, although not limited thereto, the polishing method of the present invention is applicable to polishing molar crowns manufactured from a resin, and in particular CAD/CAM crowns manufactured from a hybrid resin, for which there is an increasing demand for high volume polishing with increasing demand resulting from transitioning from a leading edge treatment to a treatment covered by health insurance.

In the following description, unless stated otherwise, an example will be described of a case in which the polishing method of the present invention is applied to polishing CAD/CAM crowns (molars) manufactured from a hybrid resin.

Polishing Device (1) Overall Configuration

Figure 2:
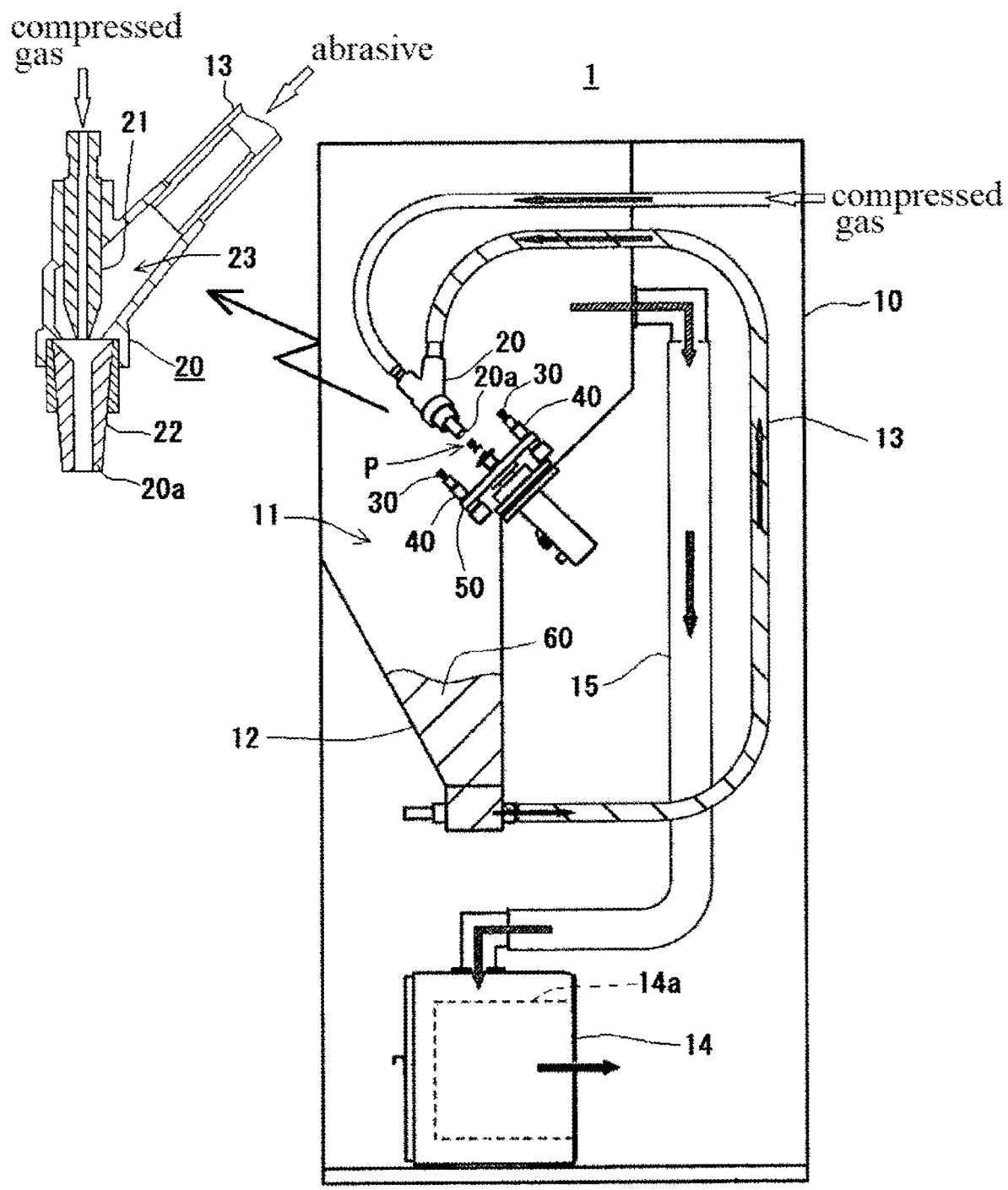
FIG. 2 is a perspective view from the side of a polishing device of the present invention.

An example of a configuration of a polishing device 1 used in the polishing method of the present invention is illustrated in FIG. 1 and FIG. 2.

The polishing device 1 illustrated in FIG. 1 and FIG. 2 is what is referred to as a "blasting apparatus" for treating workpieces by ejecting abrasives together with compressed gas (compressed air). The polishing device 1 includes a cabinet 10 that serves as an equipment housing and forms an interior space serving as a treatment chamber 11, and a blast nozzle 20. The blast nozzle 20 inside the treatment chamber 11 formed within the cabinet 10 ejects abrasives together with compressed gas onto artificial teeth 30 to be polished.

The treatment chamber 11 is formed with a hopper 12 having an inverted trapezoidal shaped lower section for catching the abrasives 60 ejected through the blast nozzle 20. The treatment chamber 11 is configured to recover, in the hopper 12, fallen abrasives 60 ejected into the treatment chamber 11. The recovered abrasives 60 can then be re-ejected through the blast nozzle 20 via an abrasive feed pipe 13.

In the illustrated embodiment, the blasting apparatus is configured with a suction type of blast nozzle 20, as illustrated in the enlarged cross-section in FIG. 2. In what is referred to as a "suction type" model, a negative pressure is generated in a mixing chamber 23 by compressed gas introduced through the rear end of the blast nozzle 20 being ejected toward a nozzle tip 22 by a jet 21. The abrasives 60 inside the hopper 12 are sucked by the negative pressure through the abrasive feed pipe 13. This configuration enables the sucked abrasives 60 to be mixed with the compressed gas in the mixing chamber 23 and ejected through the nozzle tip 22.

The illustrated embodiment is an example of the polishing device 1 of the present invention configured by a suction type blasting apparatus. However, a blasting apparatus to be employed in the polishing device of the present invention may employ various known configurations of blasting apparatus instead of the suction type illustrated.

Examples of such blasting apparatuses are commercially available and include a gravity type blasting apparatus that causes abrasives falling from a non-illustrated abrasive tank disposed in an upper section of the cabinet 10 to be carried and ejected by compressed gas, a direct pressure type blasting apparatus in which compressed gas is introduced into a tank filled with abrasives and the abrasives are ejected by merging the flow of abrasives from the abrasive tank with a compressed gas flow from a separately provided compressed gas supply source, and a blower type blasting apparatus that carries and ejects the compressed gas flow from a direct pressure type blasting apparatus with a gas flow generated by a blower unit. Any one of the above may be employed to configure an abrasive accelerator in the polishing device 1 of the present invention.

Note that the reference numeral 14 in FIG. 1 and FIG. 2 indicates a dust collector. The dust collector 14 is configured such that dust mixed with exhaust from air sucked out from inside the treatment chamber 11 through an exhaust pipe 15 is caught in a filter 14a provided inside the dust collector 14. Clean air from which the dust has been removed is then exhausted.

(2) Support Tool

Figure 3:
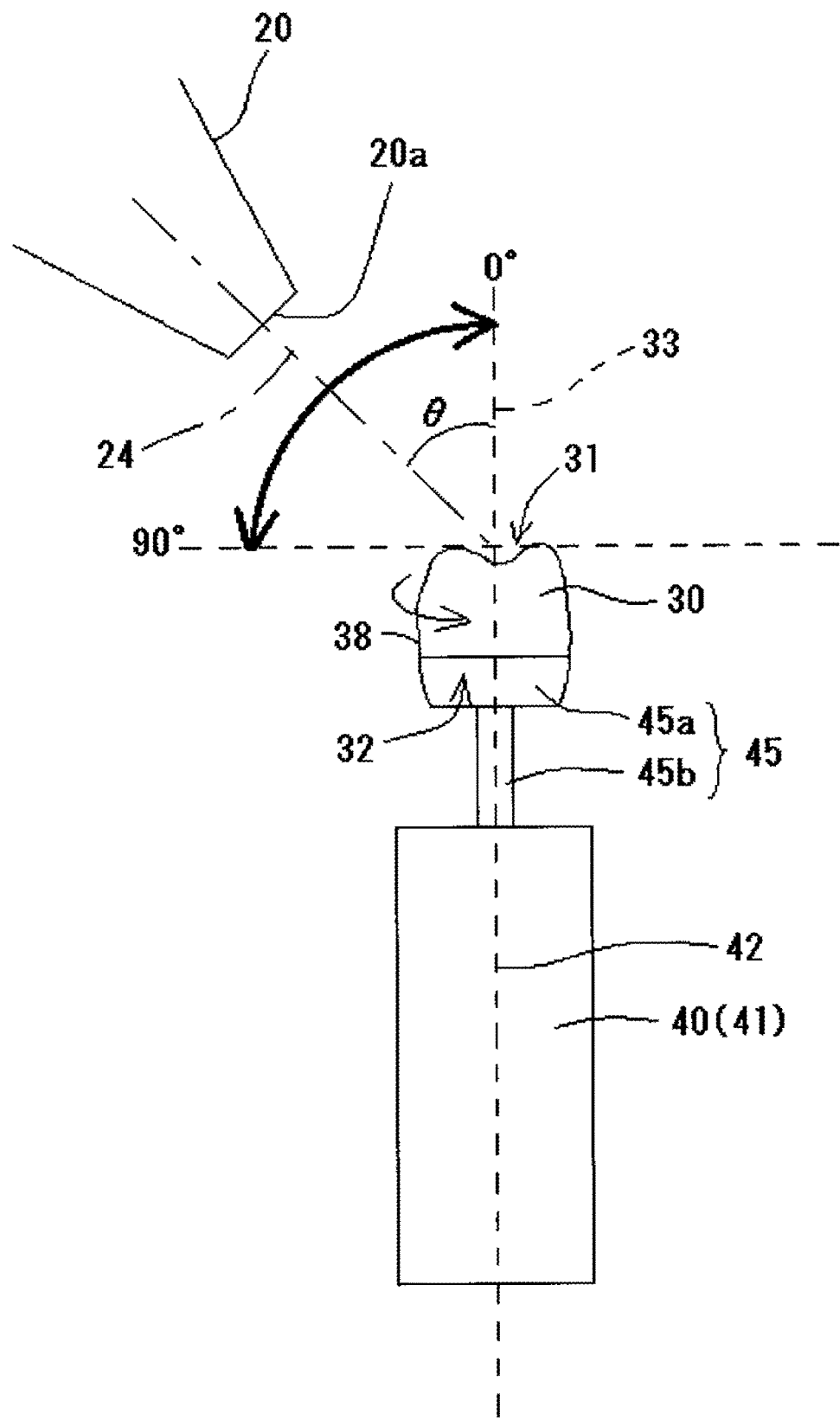
FIG. 3 is an explanatory diagram of a polishing method of the present invention.

In the polishing method of the present invention, as illustrated in FIG. 3, the artificial teeth 30 to be polished are fixed at the tooth neck 32 side thereof. The artificial teeth 30 are each rotated about a tooth axis 33, and abrasives are ejected together with compressed gas toward the occlusal portion 31 of each of the rotating artificial teeth 30.

In order to enable the abrasive to be ejected in such a state, the polishing device 1 employed in the polishing method of the present invention includes support tools 40 for supporting the artificial teeth 30 inside the treatment chamber 11, and for rotating each of the artificial teeth 30 about the tooth axis 33.

As illustrated in the enlarged illustration in FIG. 1, the support tools 40 each include a rotatable head 41 to mount the artificial tooth 30 to be polished on. The artificial tooth 30 to be polished is fixed in a predetermined position so as to be rotatable about the tooth axis 33, by mounting the artificial tooth 30 to the head 41 such that a rotation axis 42 of the head 41 and the tooth axis 33 of the artificial tooth 30 are disposed coaxially.

Mounting of the artificial tooth 30 to the head 41 may be achieved by any method that enables the fixed state of the artificial tooth 30 to be maintained even when the mixed flow of the compressed gas and the abrasives ejected from the blast nozzle 20 is being blown onto the artificial tooth 30. The illustrated embodiment is an example in which a tool 45 including a support base 45a and a spindle 45b is prepared. In this example, the artificial tooth 30 is fitted to the support base 45a of the tool 45 such that the tooth neck 32 side of the artificial tooth 30 is fixed to the tool 45. The tool 45 is mounted and fixed by a mechanical chuck 43 or a magnetic chuck (not illustrated in the drawings) provided to the head 41 of the support tool 40.

The tool 45 may be mounted to the artificial tooth 30 by, as described in the related art, fixing the artificial tooth to a tool provided with a plaster support base using an adhesive. However, when the artificial tooth 30 to be polished is an artificial tooth including a hollow portion 36 open on the tooth neck 32 side, such as a crown, the tool 45 equipped with the support base 45a and the spindle 45b as described above can be fixed to the artificial tooth 30 in the following manner. The hollow portion 36 is filled from the tooth neck 32 side with a thermoplastic material in a state softened by heating. Such a thermoplastic material is configured by a blend of a synthetic resin that softens at a temperature at or below 100° C., at about 60° C. for example, a natural resin, a wax, beeswax, or the like. After the spindle 45b has been inserted into the filled thermoplastic material, the support base 45a described above is formed by cooling to harden the thermoplastic material inside the hollow portion 36 by, for example, ejecting a coolant as a cold spray.

By forming the support base 45a using the thermoplastic material filled in the hollow portion 36 in the above manner, the artificial tooth 30 can be strongly fixed by hardening the thermoplastic material. Moreover, after polishing is finished, the tool 45 can be easily detached by softening or dissolving the thermoplastic material configuring the support base 45a by heating to a temperature at or below 100° C., for example, by cleaning with warm or hot water.

In the polishing device 1 of the present embodiment, each one of a plurality of the support tools 40 described above is further installed at regular intervals along the peripheral edge of a turntable 50, in a configuration in which the heads 41 of the support tools 40 can be moved along a single same movement path by rotating the turntable 50.

Mounting each of the artificial teeth 30 to the heads 41 of the respective support tools 40 in the configuration described above results in a configuration in which each of the artificial teeth 30 mounted to the heads 41 can be sequentially moved to a treatment position P provided at a predetermined position on the movement path as the turntable 50 is rotated.

Rotation of the turntable 50 may be achieved by a configuration in which the turntable 50 is intermittently rotated by an angle predetermined according to the number of the support tools 40 mounted, after the elapse of intervals of the time required to polish each of the artificial teeth, so as to sequentially polish each individual artificial tooth 30 that has been moved to the treatment position P. Alternatively, a configuration may be employed in which the turntable 50 is continuously rotated at a predetermined rotation speed, so as to treat plural of the artificial teeth 30 at the same time by blowing the abrasive sequentially onto the artificial teeth 30 as they pass the treatment position P.

For example, the present embodiment employs a configuration in which the heads 41, and hence the artificial teeth 30, are rotated at a rotation speed of from 4 to 100 $\min^{-1}$ (rpm), and the turntable 50 is rotated by an angle of 72° each of a set treatment time for each artificial tooth elapses (every 2 minutes, for example), such that each of the artificial teeth 30 is disposed at the treatment position P and polished for 2 minutes. However, instead of such a configuration, a configuration may be adopted in which plural artificial teeth are polished by continuously rotating the turntable 50 at a predetermined rotation speed.

(3) Blast Nozzle Placement

As illustrated in FIG. 3, the blast nozzle 20 that ejects abrasives onto the artificial tooth 30 mounted to the head 41 of the support tool 40 is placed such that the tip 20*a* of the blast nozzle 20 points toward the occlusal portion (occlusal surface) 31 of the artificial tooth 30 mounted to the head 41 of the support tool 40, and such that an inclination angle θ of a central axis 24 of the blast nozzle 20 with respect to the rotation axis 42 of the head 41, and hence with respect to the tooth axis 33 of the artificial tooth 30, is from 0° to 90°.

Namely, in the polishing device 1 of the present invention, the placement range of the blast nozzle 20 is a range indicated by the bold arrow in FIG. 3.

The inclination angle θ is more preferably set at from 15° to 75°, such that the abrasives are incident at an angle to both the occlusal surface 31 and the side surfaces 38 of each of the artificial teeth 30.

In a configuration in which a single support tool 40 is installed inside the treatment chamber 11, as illustrated in FIG. 3, the blast nozzle 20 may be placed at the position and angles described above with respect to the single support tool 40. However, in a configuration of the polishing device 1 of the present embodiment in which the plural support tools 40 are installed at even separations around the peripheral edge of the turntable 50 as described above, the tip 20*a* of the blast nozzle 20 is disposed pointing toward the treatment position P provided at the predetermined position on the movement path of the heads 41. The tip 20*a* of the blast nozzle 20 is thereby pointed in the direction and angle described above toward the artificial tooth 30 that has been moved to the treatment position P, from out of the plural artificial teeth 30 mounted to the respective support tools 40.

(Polishing Conditions)

(1) Abrasives Employed

Various types of known abrasives may be employed as the abrasives employed in the polishing method for artificial teeth of the present invention performed with the polishing device 1 as described above. Various types of abrasive grain may be employed in the polishing method of the present invention, including metal-based, mineral-based, ceramic-based, resin-based, glass-based, and plant-based grains. The substance and the particle diameter of the abrasive may be suitably selected according to the material and the finishing state of the artificial teeth to be polished.

Preferably an elastic abrasive is employed as the abrasives employed in the polishing method of the present invention.

Elastic abrasives include structures in which abrasive grains are adhered to the surface of cores formed from an elastic material, and structures in which abrasive grains are kneaded into an elastic material. An elastic abrasive with either of these structures may be employed with the polishing method of the present invention.

Moreover, various materials are proposed as elastic materials for use in elastic abrasives, such as rubber and elastomers, as well as materials configured by gelatin, glucomannan, or the like. The polishing method of the present invention is obviously able to employ such materials, and may also employ various known elastic abrasives using other elastic materials.

Though the particle diameter of the elastic abrasive employed is not particularly limited when using an elastic abrasive, preferably an elastic material with an average particle diameter of from 200 μm to 1000 μm is employed. This enables polishing to be performed right to the bottom of indentations, even in cases in which the artificial teeth to be polished have indentations such as fissures present in the occlusal surfaces, as is the case with molars.

Moreover, the substance and particle diameter of the abrasive grains kneaded into the elastic material, or adhered to the surface of cores formed from the elastic material, may be suitably selected according to the material and finishing state of the artificial teeth to be polished. However, abrasive grains having an average particle diameter from several μm to several tens of μm are preferably employed in order to achieve a glossy finish or a mirror finish, and the elastic abrasive that have abrasive grains of smaller particle diameters kneaded therein, or adhered thereto, may employed in a stepwise manner according to the state of polishing.

(2) Ejection Conditions

The abrasives are ejected together with the compressed gas onto the artificial tooth 30 described above through the blast nozzle 20 that has been placed at the position and angles described above.

The compressed gas employed to eject the abrasives may be compressed air, and may also be a compressed gas of an inert gas such as argon or nitrogen. However, it is advantageous to use compressed air from the perspective of cost.

The ejection pressure of the compressed gas employed to eject the abrasive should be selected from a range of 0.1 MPa to 0.5 MPa based on the material and treatment time of the artificial teeth 30 to be polished (i.e., time for ejecting the abrasives to the artificial teeth 30 to be polished) as well as the particle diameters and the substance of the abrasive employed, and the like.

The treatment time needs to be suitably adjusted according to the material and shape of the artificial teeth to be polished, and the substance and particle diameter of the abrasive (abrasive grains) employed. However, the treatment time for each individual artificial tooth is from several tens of seconds to several minutes, approximately.

(Operation Etc.)

By pointing the tip 20*a* of the blast nozzle 20 toward the occlusal surface 31 of the artificial tooth 30, and by ejecting the abrasives together with the compressed gas in a range in which the inclination angle θ of the central axis 24 of the blast nozzle 20 with respect to the tooth axis 33 is from 0° to 90°, as described above, the compressed gas ejected through the blast nozzle 20 impacts the artificial tooth 30, and then forms a flow along the surface of the artificial tooth 30.

As a result, the abrasives ejected together with the compressed gas move along with the flow of the compressed gas, and the surface of the artificial tooth 30 is polished by the abrasives sliding over the surface of the artificial tooth 30.

Figure 4A:
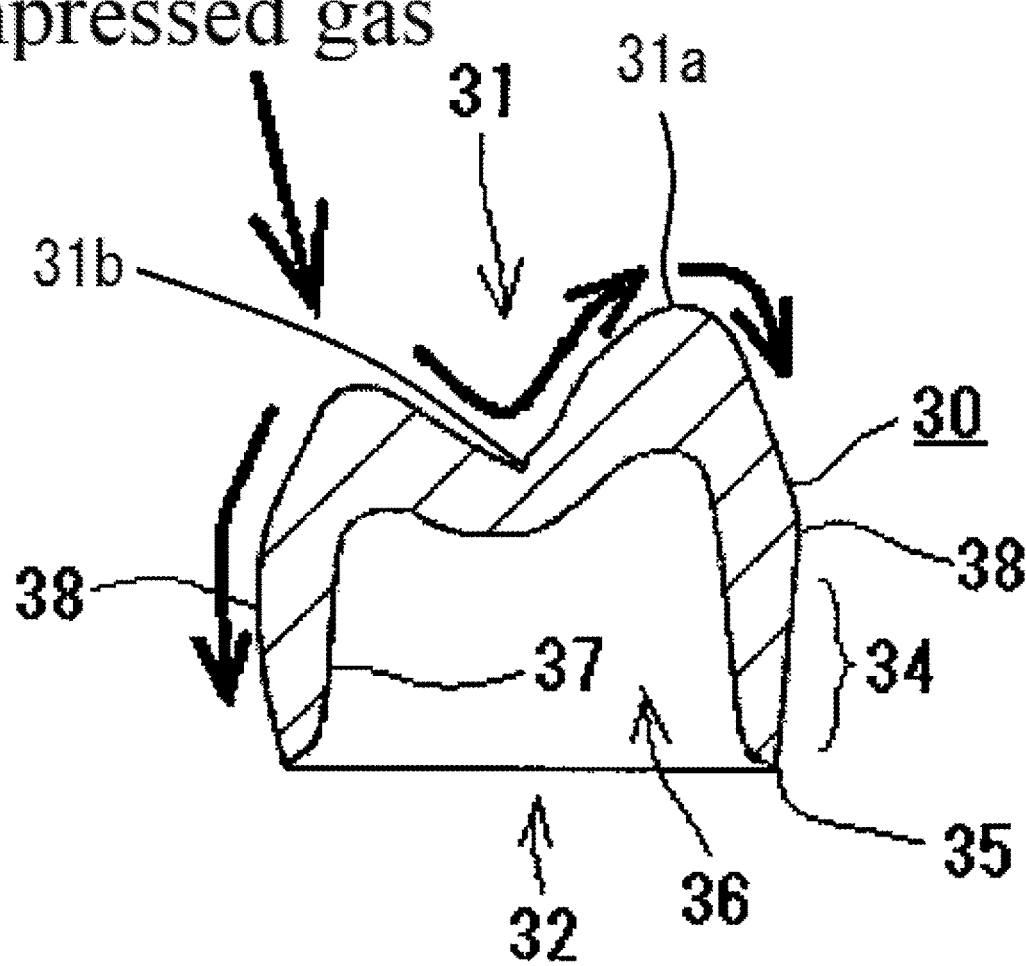
FIGS. 4A and 4B are explanatory diagrams of polishing a crown.

Due to ejecting the abrasives in the ejection direction described above, a flow of abrasives is generated at the side surfaces 38 of the artificial tooth 30, flowing from the occlusal surface 31 side of the artificial tooth 30 toward the tooth neck 32 side thereof as illustrated in FIG. 4A. An edge 35 portion of the margin portion 34 is accordingly polished by a natural transition from the margin portion 34 toward the support base, and wall thinning etc. due to over polishing of the margin portion 34 can be prevented.

Moreover, due to the flow of the abrasives being generated in this manner from the occlusal surface 31 side to the tooth neck 32 side, the entry of abrasive into the hollow portion 36 is not liable to occur even in cases in which polishing is performed in a state in which the hollow portion 36 has not been sealed off. Falling out or loose fitting due to polishing an internal wall 37 of the hollow portion 36 can accordingly be prevented.

Figure 4B:
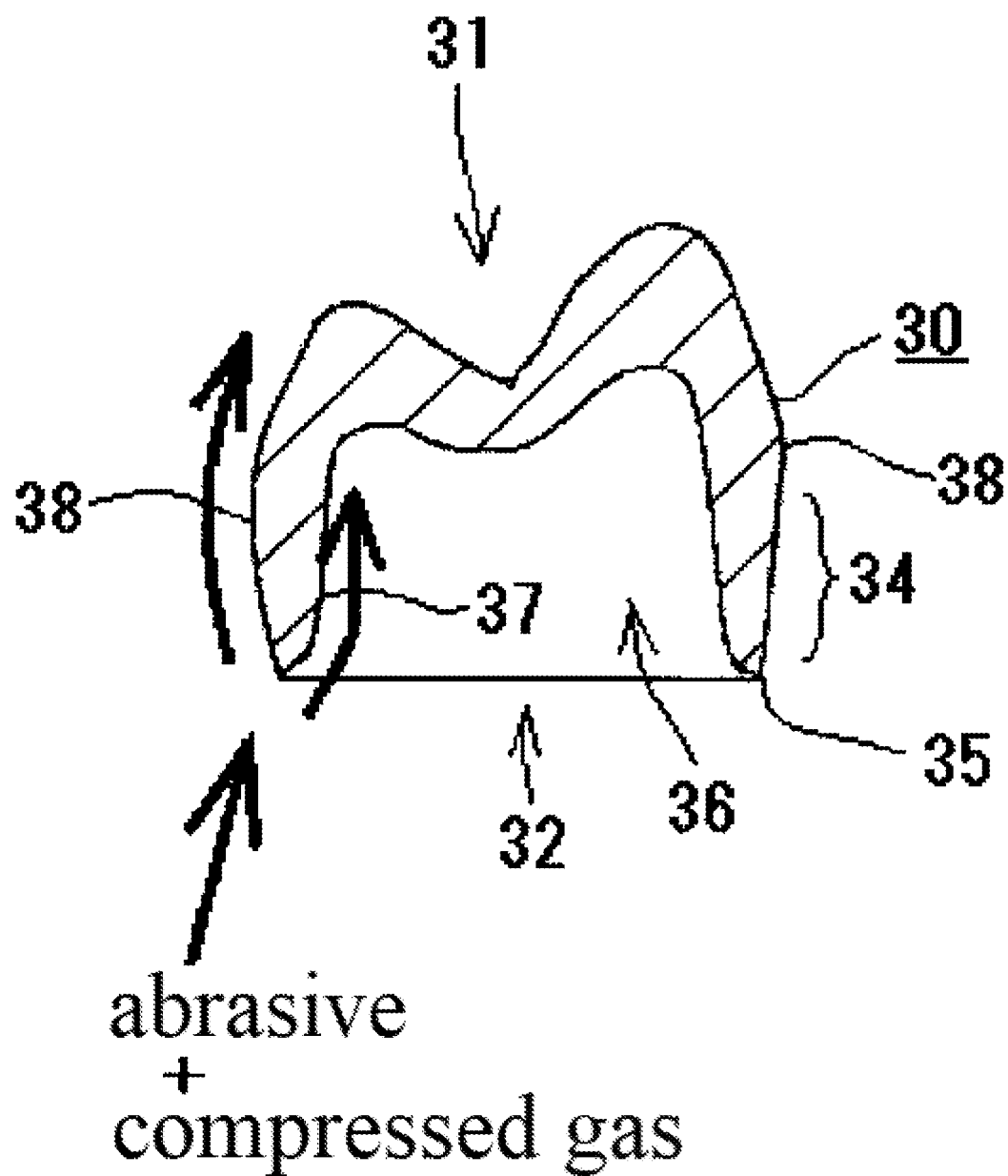
Figure 5:
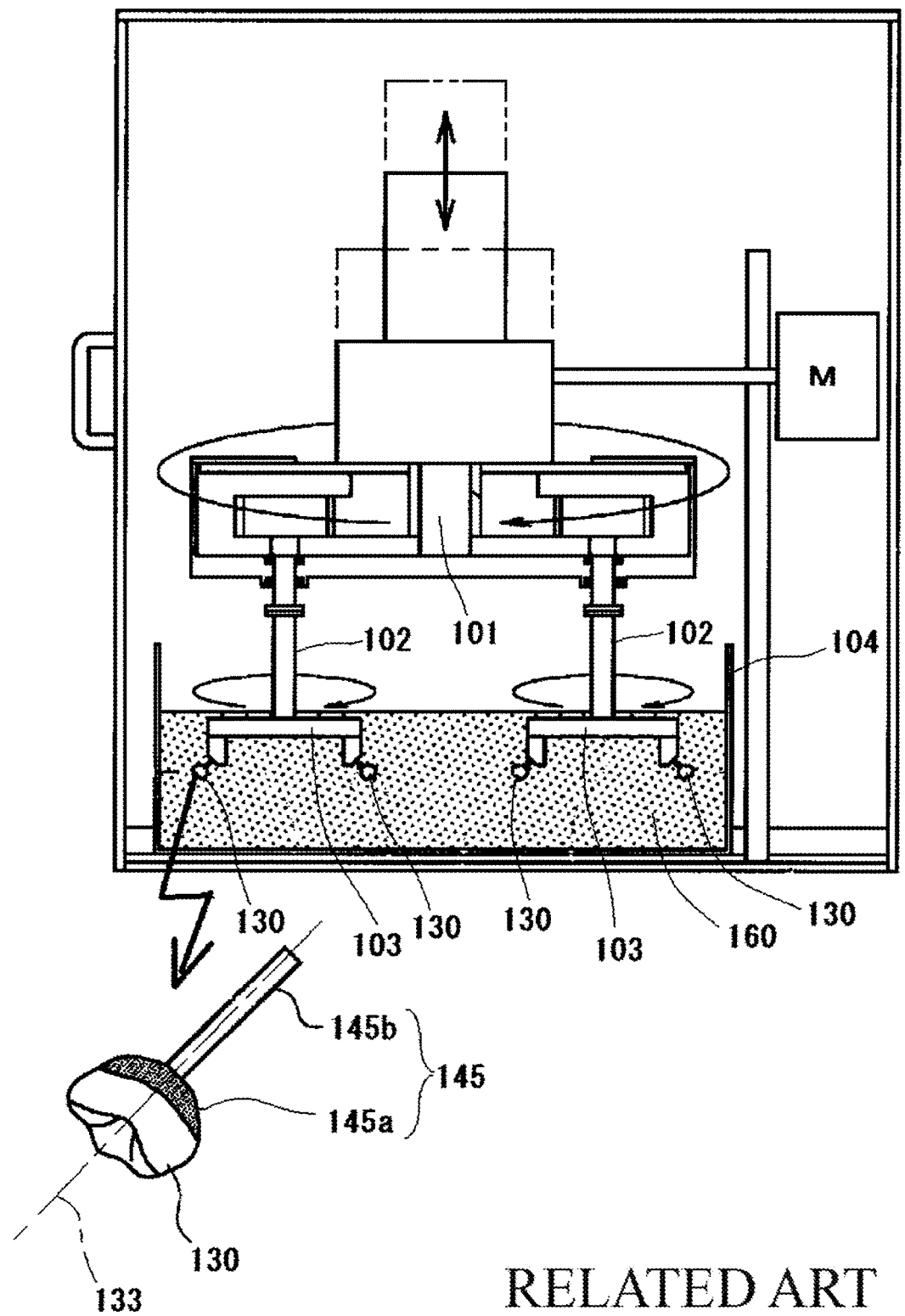
FIG. 5 is an explanatory diagram of a conventional polishing device (JP2015-223325A)
Figure 6A:
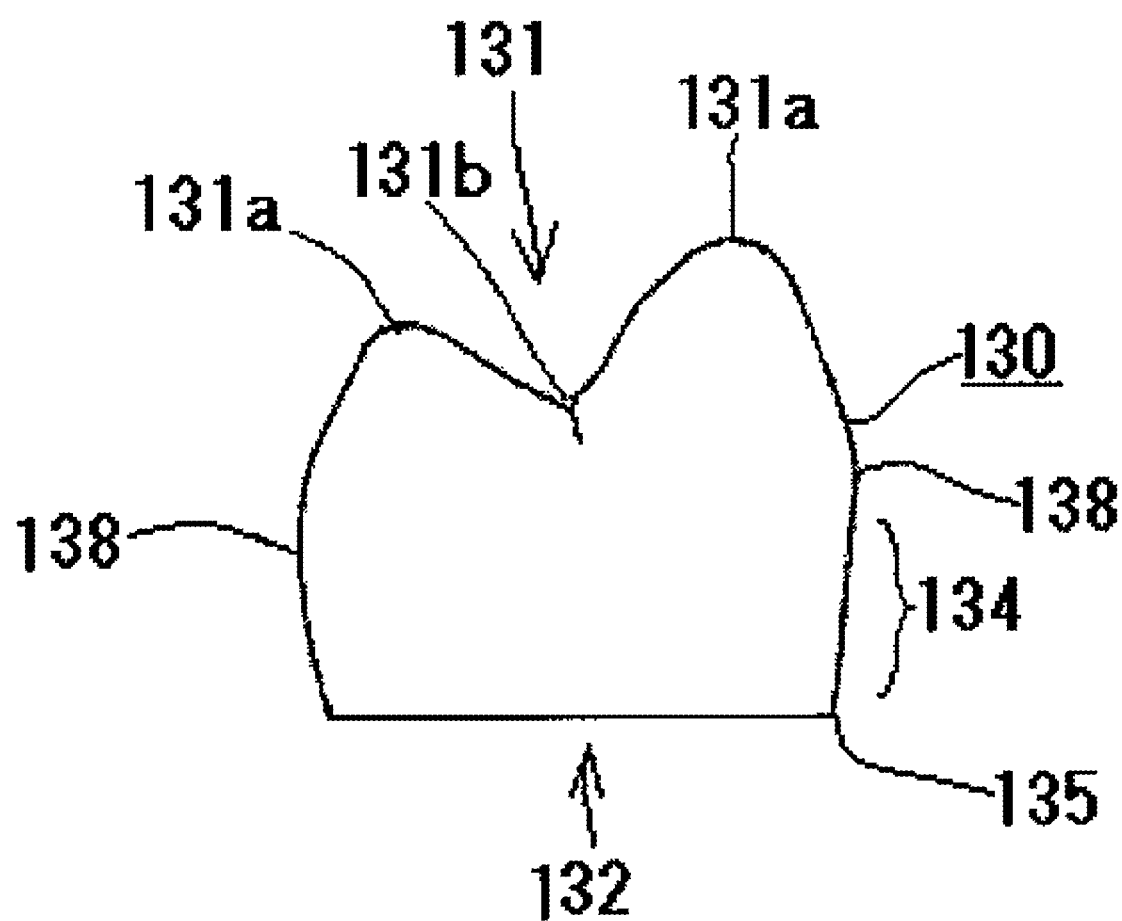
FIGS. 6A and 6B are explanatory diagrams of an artificial tooth.
Figure 6B:
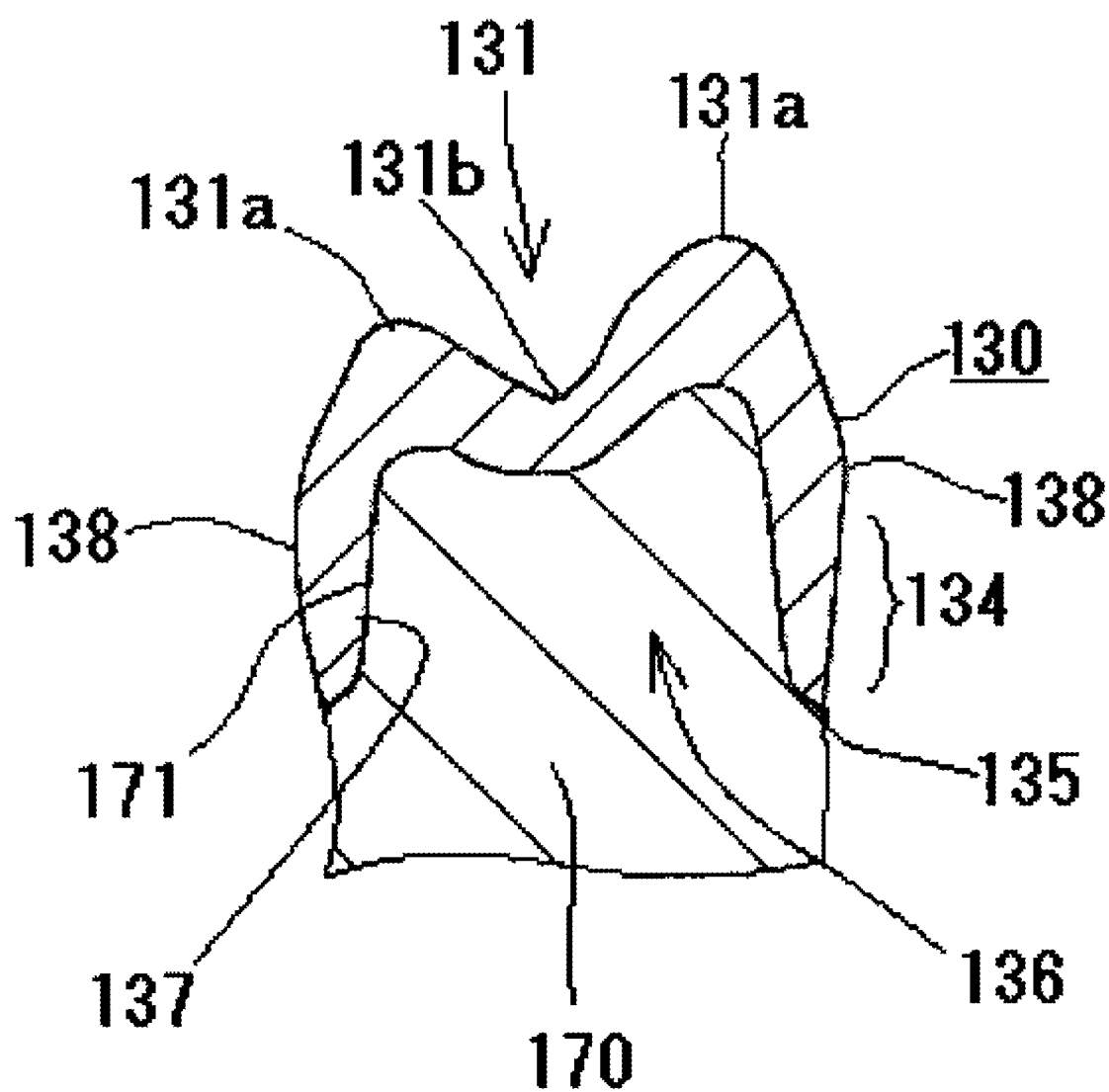

On the contrary thereto, when the abrasives are ejected toward the tooth neck 32 from a position in which the inclination angle θ exceeds 90°, not only would the occlusal surface 31 not be polished, but a flow of the abrasives at the side surface 38 portion of the artificial tooth 30 would be generated from the tooth neck 32 side to the occlusal surface 31 side, as illustrated in FIG. 4B, thereby the margin portion 34 and the edge 35 of the margin portion 34 are ground by the abrasives. Accordingly, the strength would be decreased due to wall thinning of the margin portion 34, and a not-flat portion would appear between the anchor tooth and the edge 35 of the margin portion 34 after being fitted.

Moreover, when polishing is performed in a state in which the hollow portion 36 of the artificial tooth 30 is either unsealed, or insufficiently sealed, the abrasive would enter into the hollow portion 36 and the internal wall 37 would be polished. This would give rise to a concern regarding falling out or loose fitting after being fitted. However, the polishing method of the present invention is able to prevent such a decrease in strength, prevent a not-flat portion from appearing, and prevent loose fitting from occurring.

Moreover, in the polishing method of the present invention, polishing to a glossy finish or a mirror finish can be achieved due to abrasives entering even into fine indentations present on the surface of the artificial tooth 30, such as fissures 31b formed in the occlusal surface 31 of the artificial tooth 30. This enables all the portions of the artificial tooth 30 to be polished in a single polishing device, without separately performing polishing of the fissures 31b by manual operation, or the like.

EXAMPLES

Examples of polishing tests in which artificial teeth were polished by the polishing method of the present invention will now be illustrated by Examples.

(Test Method)

Polishing was performed by the polishing method of the present invention on artificial teeth manufactured from a resin (Example 1), on artificial teeth manufactured from a metal (Example 2), and on artificial teeth manufactured from a ceramic (Example 3). The materials of each of the artificial teeth and the polishing conditions are listed in Table 1.

Note that the artificial teeth that were treated were all crowns replicating molars.

TABLE 1

Materials of Artificial Teeth and Polishing Conditions

|  | Example 1 | Example 2 | Example 3 |
|---|---|---|---|
| Material | Hybrid resin (hardened resin in which silica | Cobalt-chrome | Zirconia |

TABLE 1-continued

Materials of Artificial Teeth and Polishing Conditions

|  | Example 1 | Example 2 | Example 3 |
|---|---|---|---|
|  | powders having a major particle diameter of 10 μm or less are contained) | | |
| Abrasive Employed | "Sirius Z", manufactured by Fuji Manufacturing Co., Ltd. (an elastic abrasive in which abrasive grains kneaded into an elastomer). Average particle diameter: 800 μm. Abrasive Grains: Diamond #10000 (D50: 0.6 μm) | | |
| Blasting Apparatus | Suction type (see FIG. 1 and FIG. 2) | | |
| Angle θ between nozzle and tooth axis | 30° | 30° | 30° |
| Ejection Pressure | 0.2 MPa | 0.3 MPa | 0.3 MPa |
| Ejection Distance | 20 mm | 20 mm | 20 mm |
| Rotation Speed of Artificial Teeth | 4 min$^{-1}$ | 30 min$^{-1}$ | 50 min$^{-1}$ |
| Treatment Time | 2 min/tooth | 3 min/tooth | 3 min/tooth |

Test Results (1) Example 1

The surface roughness of artificial teeth as per Example 1 (polishing artificial teeth manufactured from hybrid resin) was measured before and after polishing using a contact needle type of surface roughness measuring instrument (manufactured by Tokyo Seimitsu Co., Ltd.). The results thereof are listed in Table 2 together with the results of observing the state of glossiness with the naked eye.

TABLE 2

Surface Roughness Before and After Polishing
(Artificial Teeth Manufactured from Hybrid Resin)

|  | Ra (μm) Before Polishing | Ra (μm) After Polishing |
|---|---|---|
| Occlusal Surface | 0.82 | 0.08 |
| Side Surface | 1.73 | 0.56 |
| Glossiness | None | Good |

It is apparent from the above results that the surface roughness can be greatly improved and polishing can also achieve a state of good glossiness by polishing artificial teeth manufactured from a hybrid resin using the polishing method of the present invention. The finishing polish of the artificial teeth can also be achieved in an extremely short duration of 2 minutes per tooth.

Moreover, there was absolutely no polishing reaching the hollow portion of the artificial teeth observed after polishing, and no wall thinning or deformation (such as retreating peripheral edge) observed at the margin portion after polishing. A polished state was achieved in which there were no concerns of cracks and breaks, wobbling, appearance of a not-flat portion against the anchor tooth, or the like after being fitted.

Note that a finish giving a feeling of excellent glossiness could similarly be obtained in the artificial teeth after polishing for Example 2 (polishing a crown manufactured from a metal) and for Example 3 (polishing a crown manufactured from ceramic). The polishing method of the present invention was confirmed to be suitably applicable to performing a finishing polish of artificial teeth, irrespective of the material of the artificial teeth.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

DESCRIPTIONS OF REFERENCE NUMERALS 1 polishing device
10 cabinet
11 treatment chamber
12 hopper
13 abrasive feed pipe
14 dust collector
14a filter
15 exhaust pipe
20 blast nozzle 20
20a tip (of blast nozzle)
21 jet
22 nozzle tip
23 mixing chamber
24 central axis
30 artificial tooth (crown)
31 occlusal portion (occlusal surface)
31a cusps
31b fissures
32 tooth neck
33 tooth axis
34 margin portion
35 edge
36 hollow portion
37 internal wall
38 side surface
40 support tool
41 head
42 rotation axis
43 chuck
45 tool
45a support base
45b spindle
50 turntable
60 abrasive
100 polishing device
101 first rotation shaft
102 second rotation shaft
103 holder
104 abrasive tank
130 artificial teeth (crown)
131 occlusal portion (occlusal surface)
131a cusp
131b fissure
133 tooth axis
134 margin portion
135 edge
136 hollow portion
137 inner wall
138 side surface
145 tool
145a plaster support base
145b spindle
160 abrasive
170 anchor tooth
171 shaft face
P treatment position
M motor
θ inclination angle

The invention claimed is:

1. A method for polishing artificial teeth comprising:
mounting a spindle acting as an axis of rotation at a tooth neck side of an artificial tooth to be polished coaxially with a tooth axis;
fixing the artificial tooth via the spindle;
rotating the artificial tooth about the tooth axis of the artificial tooth; and
polishing an occlusal portion and a side surface of the artificial tooth by ejecting an abrasive together with compressed gas through a blast nozzle having a tip pointing toward the occlusal portion of the rotating artificial tooth, with the blast nozzle inclined so that an inclination angle of a central axis of the blast nozzle with respect to the tooth axis is from 0° to 90°,
wherein the artificial tooth is an artificial tooth including a hollow portion open on the tooth neck side of the artificial tooth; and
the spindle is mounted to the artificial tooth by heating to soften a thermoplastic material that softens at a temperature at or below 100° C., filling the hollow portion of the artificial tooth to be polished with the thermoplastic material from the tooth neck side of the artificial tooth, and after inserting one end of the spindle into the softened thermoplastic material, cooling to harden the thermoplastic material.

2. The method according to claim 1, wherein an elastic abrasive formed by dispersing abrasive grains within an elastic material, or an elastic abrasive formed by adhering abrasive grains to a surface of a core formed from an elastic material, is employed as the abrasive.

3. The method according to claim 1, wherein the abrasive is ejected in a state in which the central axis of the blast nozzle is inclined so that an inclination angle with respect to the tooth axis is from 15° to 75°.

4. The method according to claim 1, wherein:
a plurality of artificial teeth are moved along a common movement path;
the tip of the blast nozzle which is common to the plurality of teeth is placed so as to point toward a treatment position at a predetermined position on the movement path, so that the tip of the blast nozzle points toward the occlusal portion of the artificial tooth present at the treatment position.

5. The method according to claim 1, wherein the artificial tooth is an artificial tooth of a molar single crown manufactured from a resin containing an inorganic filler.

6. The method according to claim 2, wherein:
a plurality of artificial teeth are moved along a common movement path;
the tip of the blast nozzle which is common to the plurality of teeth is placed so as to point toward a treatment position at a predetermined position on the movement path, so that the tip of the blast nozzle points toward the occlusal portion of the artificial tooth present at the treatment position.

7. The method according to claim 2, wherein the artificial tooth is an artificial tooth of a molar single crown manufactured from a resin containing an inorganic filler.

8. The method according to claim 4, wherein the artificial tooth is an artificial tooth of a molar single crown manufactured from a resin containing an inorganic filler.

\* \* \* \* \*